(12) United States Patent
Hama

(10) Patent No.: US 10,750,034 B2
(45) Date of Patent: Aug. 18, 2020

(54) IMAGE READING APPARATUS AND METHOD OF CONTROLLING IMAGE READING APPARATUS

(71) Applicant: CANON KABUSHIKI KAISHA, Tokyo (JP)

(72) Inventor: Mikio Hama, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/201,251

(22) Filed: Nov. 27, 2018

(65) Prior Publication Data

US 2019/0166264 A1 May 30, 2019

(30) Foreign Application Priority Data

Nov. 30, 2017 (JP) .................. 2017-230835

(51) Int. Cl.
*H04N 1/00* (2006.01)
*H04N 1/32* (2006.01)

(52) U.S. Cl.
CPC ..... *H04N 1/00331* (2013.01); *H04N 1/00408* (2013.01); *H04N 1/00795* (2013.01); *H04N 1/32064* (2013.01); *H04N 1/32358* (2013.01)

(58) Field of Classification Search
None
See application file for complete search history.

(56) References Cited

U.S. PATENT DOCUMENTS

| 5,963,623 A * | 10/1999 | Kim ..................... H04M 1/2755 379/100.01 |
| 2013/0132716 A1* | 5/2013 | Morita ................. H04N 1/4406 713/155 |
| 2013/0135678 A1* | 5/2013 | Endo .................. G07B 17/0008 358/1.15 |

FOREIGN PATENT DOCUMENTS

JP     11-027313 A     1/1999

OTHER PUBLICATIONS

Kimura Takashi, Control Method for Network Facsimile Equipment, Jan. 29, 1999, Ricoh Co Ltd, Machine_Translation_of_JP_11_027313_A (Year: 1999).*

* cited by examiner

*Primary Examiner* — Dov Popovici
(74) *Attorney, Agent, or Firm* — Canon U.S.A., Inc. I.P. Division

(57) ABSTRACT

An image reading apparatus includes a storage unit, a reading unit, a character recognition unit, an acquisition unit, and a registration unit. The storage unit stores an address book capable of registering, in the address book, information as group destination information. The reading unit reads at least one document to generate image data. The character recognition unit recognizes character information in the image data. The acquisition unit acquires a plurality of pieces of destination information from the character information recognized by the character recognition unit. The registration unit registers, in the address book and as the group destination information, the plurality of pieces of destination information acquired by the acquisition unit.

12 Claims, 13 Drawing Sheets

< BUSINESS CARD READING >

*801* — ▪ PLACE BUSINESS CARDS ON PLATEN GLASS AND PRESS START KEY.

CLOSE — *802*

< BUSINESS CARD READING >

*803* — ▪ BUSINESS CARDS ARE BEING ANALYZED. PLEASE WAIT.

CLOSE — *802*

FIG.9A

< RESULT OF BUSINESS CARD READING >

FIRST BUSINESS CARD IS BEING EDITED.
TWO BUSINESS CARDS ARE READY FOR PROCESSING.

1/3

○× TRADING COMPANY
SALES DIRECTOR
SABURO YAMAMOTO

XXX-XX-X, CHIYODA WARD, TOKYO
Fax: 03-1234-5678
E-mail: yamamoto-s@marubatu-shoji.com

■ NAME
[ SABURO YAMAMOTO ]
[ SABURO YAMAMOTO ] [EDIT]

■ FAX    □ REGISTER
[ Fax: 03-1234-5678 ]
[ 03-1234-5678 ] [EDIT]

■ E-mail ☑ REGISTER
[ E-mail: yamamoto-s@marubatu-shoji.com ]
[ yamamoto-s@marubatu-shoji.com ] [EDIT]

[CANCEL]　[RETURN]　[NEXT]

FIG.9B

< RESULT OF BUSINESS CARD READING >

THIRD BUSINESS CARD IS BEING EDITED.
NO MORE BUSINESS CARD.

3/3

○× TRADING COMPANY
SALES MANAGER
TARO SUZUKI

XXX-XX-X, CHIYODA WARD, TOKYO
Fax: 03-1234-5678
E-mail: suzuki-taro@marubatu-shoji.com

■ NAME
[ TARO SUZUKI ]
[ TARO SUZUKI ] [EDIT]

■ FAX    □ REGISTER
[ Fax: 03-1234-5678 ]
[ 03-1234-5678 ] [EDIT]

■ E-mail ☑ REGISTER
[ E-mail: suzuki-taro@marubatu-shoji.com ]
[ suzuki-taro@marubatu-shoji.com ] [EDIT]

[CANCEL]　[RETURN]　[NEXT]

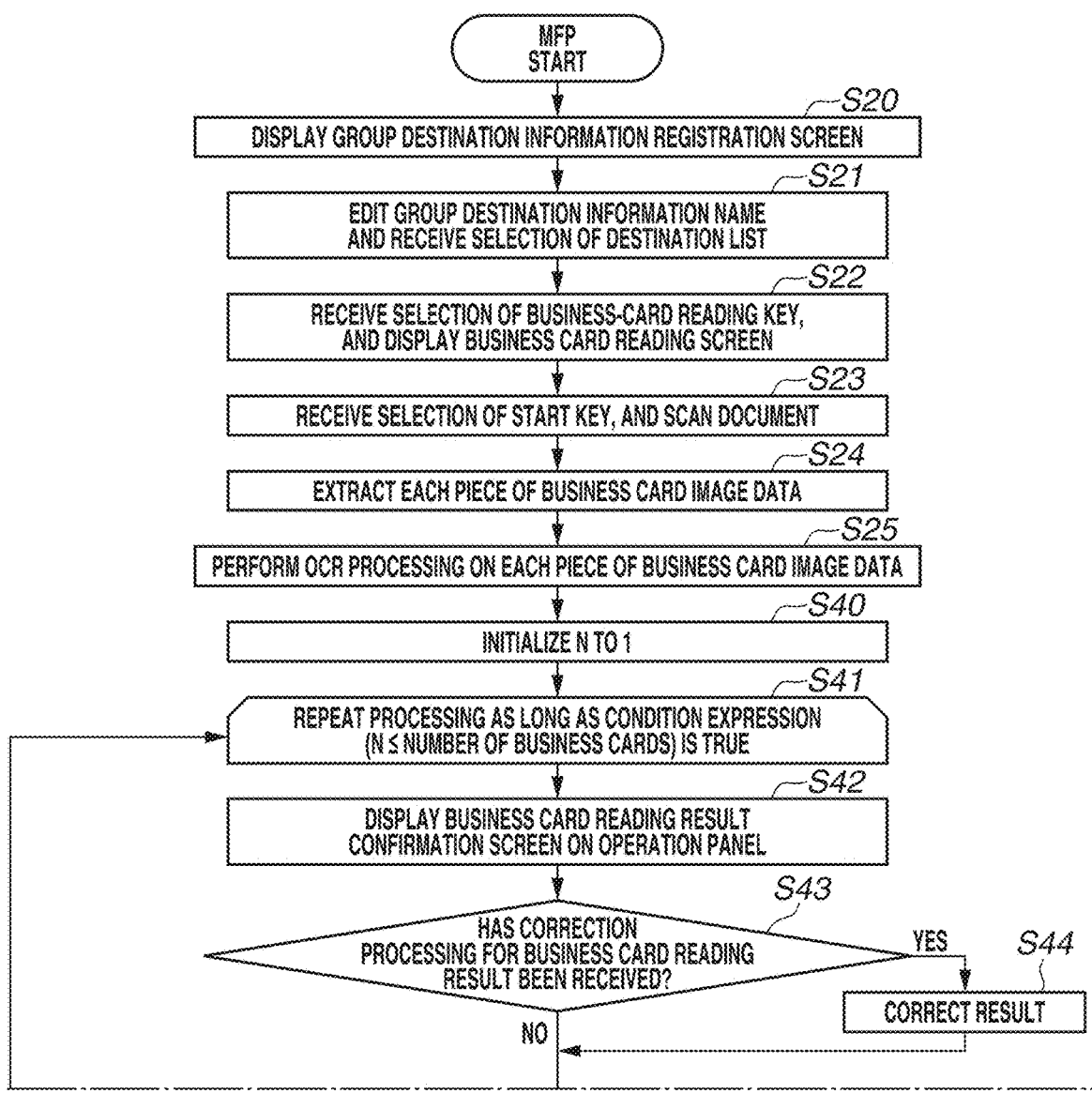

IMAGE READING APPARATUS AND METHOD OF CONTROLLING IMAGE READING APPARATUS

BACKGROUND OF THE INVENTION

Field of the Disclosure

The present disclosure relates to an image reading apparatus that registers address information obtained from a read document and a method of controlling the image reading apparatus.

Description of the Related Art

A technique to register destination information including an address, a telephone number, etc. printed on a business card, in an address book included in an image reading apparatus (hereinafter, referred to as multifunction peripheral (MFP)) has been well-known. For example, Japanese Patent Application Laid-Open No. H11-027313 discusses a network facsimile apparatus that includes a function of reading a mail address using character recognition from an image of a business card placed on a platen glass, and registering the mail address in an address book.

In a configuration of the network facsimile apparatus discussed in Japanese Patent Application Laid-Open No. H11-027313, a business card is read and one piece of destination information is registered in the address book, which is all about the registration processing of the destination information in the address book.

With such a configuration, to register group destination information including a plurality of pieces of destination information in the address book, it is necessary for a user to select certain pieces of destination information from the plurality of pieces of destination information registered in the address book and set the selected pieces of destination information as group destination information.

SUMMARY OF THE INVENTION

According to an aspect of the present disclosure, an image reading apparatus includes a storage unit configured to store an address book capable of registering, in the address book, information as group destination information, a reading unit configured to read at least one document to generate image data, a character recognition unit configured to recognize character information in the image data, an acquisition unit configured to acquire a plurality of pieces of destination information from the character information recognized by the character recognition unit, and a registration unit configured to register, in the address book and as the group destination information, the plurality of pieces of destination information acquired by the acquisition unit.

Further features of the present disclosure will become apparent from the following description of embodiments with reference to the attached drawings.

BRIEF DESCRIPTION OF THE DRAWINGS

FIGS. 8A and 8B are diagrams each illustrating a business card reading screen which is displayed on the operation unit when a business card reading key is selected.

FIGS. 9A and 9B are diagrams each illustrating a business card reading result screen which is displayed on the operation unit after destination information acquisition processing.

DESCRIPTION OF THE EMBODIMENTS

Some embodiments of the present disclosure are described in detail with reference to accompanying drawings. The following embodiments do not intend to limit the disclosure according to claims, and all of combinations of characteristics described in the embodiments are not necessarily essential for solution of the present disclosure.

A first embodiment of the present disclosure is described in detail with reference to FIG. 1A to FIG. 11.

Figure 1A:
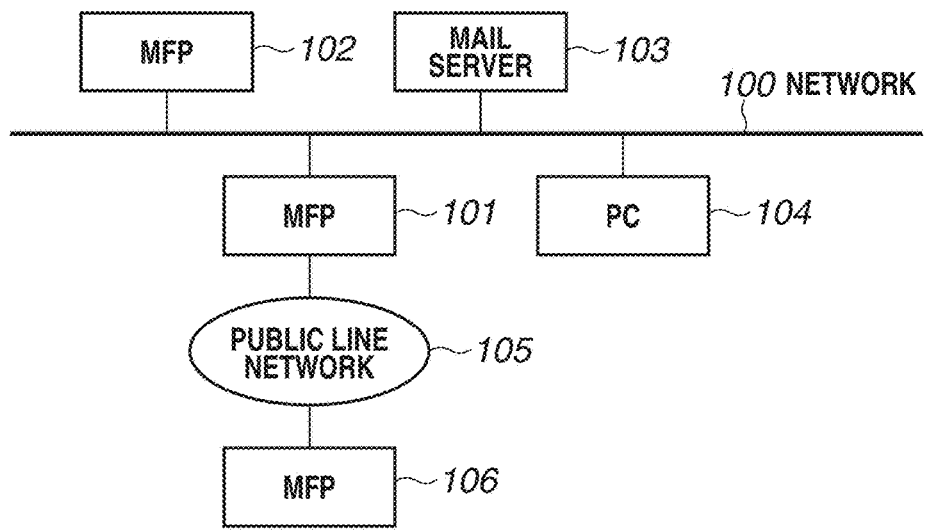
FIG. 1A is a block diagram illustrating a network configuration.

FIG. 1A is a block diagram illustrating a network configuration of the present disclosure.

In FIG. 1A, an image reading apparatus (hereinafter, multifunctional peripheral (MFP) 101) is shown as an example of a transmission source, and another image reading apparatus (hereinafter, MFP 102) and yet another image reading apparatus (hereinafter, MFP 106) are each shown as an example of a transmission destination.

In FIG. 1A, the MFP 101, the MFP 102, a mail server 103, and a personal computer (PC) 104 are connected via a network 100 to communicate with each other.

Further, the MFP 101 and the MFP 106 are connected via a public line network 105 to communicate with each other.

The MFP 101 transmits an electronic mail including read image data to the MFP 102 or the PC 104 via the mail server 103.

The mail server 103 stores an electronic mail received from the MFP 101 in a mail box provided in a storage (not illustrated) as an electronic mail to be received by the MFP 102.

The MFP 102 receives the electronic mail transmitted by the MFP 101 from the mail box of the mail server 103 using a receiving account set for electronic mail.

The PC 104 receives the electronic mail transmitted by the MFP 101 from the mail box of the mail server 103 using a receiving account set for electronic mail.

The MFP 106 receives a facsimile transmitted from the MFP 101 to a fax number.

In FIG. 1A, the network 100 is illustrated as a local network. Alternatively, any network, such as the Internet and a data-transmittable network including a wireless connection to an access point (not illustrated) may be used as an alternative communication unit.

Figure 1B:
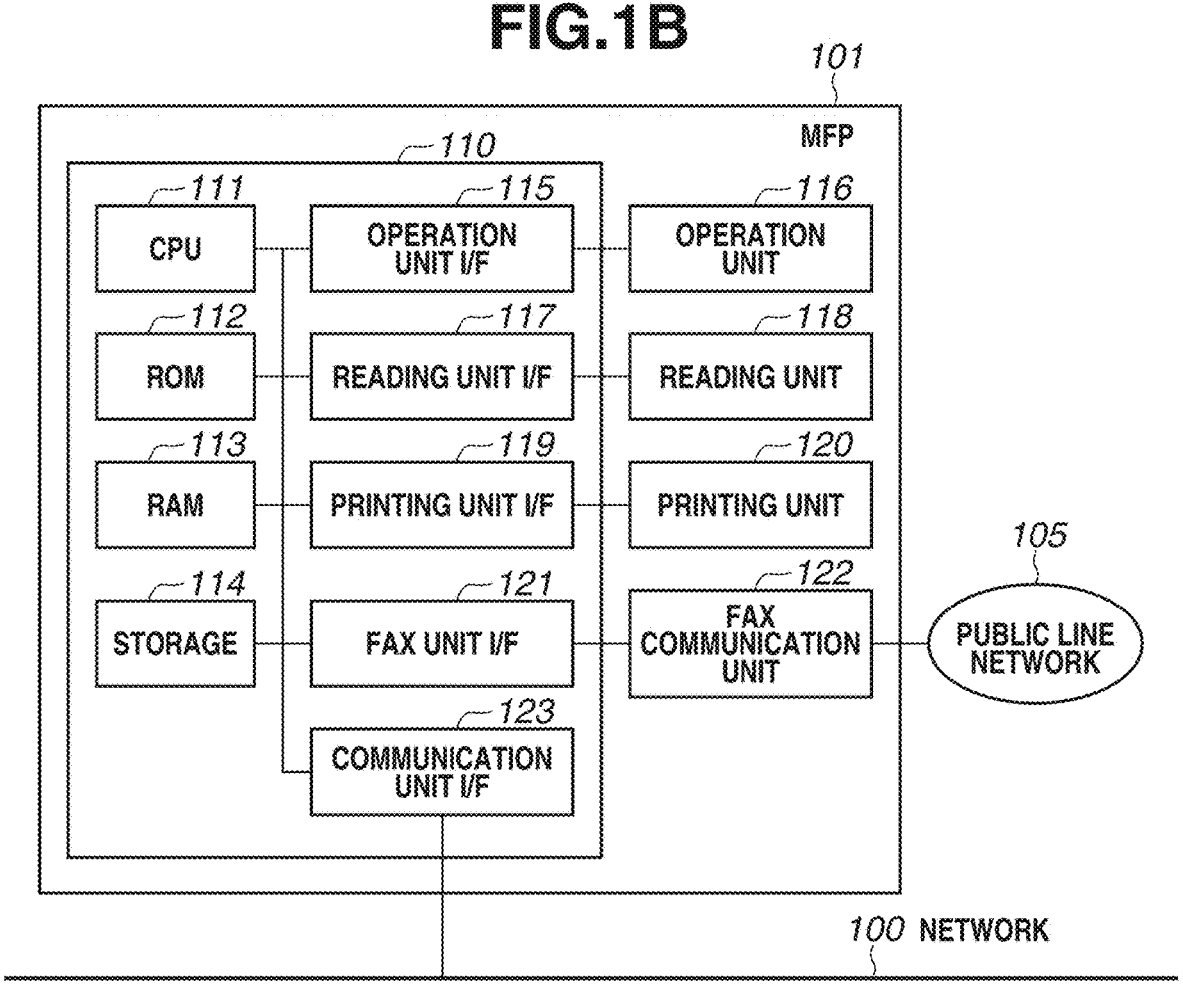
FIG. 1B is a block diagram illustrating a configuration of a multifunctional peripheral (MFP).

FIG. 1B is a block diagram illustrating a configuration of the MFP 101 according to the present embodiment. A control unit 110 including a central processing unit (CPU) 111 controls entire operation of the MFP 101. The CPU 111 reads a control program stored in a read-only memory (ROM) 112 or a storage 114 to perform various kinds of control, such as conversion control and transmission control.

The ROM 112 stores therein the control program executable by the CPU 111. The ROM 112 further stores therein a boot program, font data, etc. A random access memory (RAM) 113 is a main storage memory of the CPU 111, and is used as a work area or a temporary storage area for various kinds of control programs stored in the ROM 112 and the storage 114. The storage 114 stores therein image data, print data, various kinds of programs, and various kinds of setting information. In the present embodiment, a flash memory is applied as the storage 114. Alternatively, an auxiliary storage device, such as a solid state drive (SSD) and a hard disk drive (HDD) may be used.

An operation unit interface (I/F) 115 connects an operation unit 116 to the control unit 110. The operation unit 116 displays information to a user as a display unit and detects an input from the user. The detected user input is notified to the CPU 111 via the operation unit I/F 115. The CPU 111 then performs control based on the notified input.

A reading unit I/F 117 connects a reading unit 118 to the control unit 110. The reading unit 118 is an image generation unit that reads an image of a document and generates image data from the read image. The CPU 111 controls transmitting of the image data generated by the reading unit 118 to an external apparatus via a communication unit I/F 123.

Alternatively, the CPU 111 can control inputting of the image data to a printing unit 120 via the reading unit I/F 117 and a printing unit I/F 119, to cause the printing unit 120 to perform printing on a recording sheet based on the input image data. Further, the CPU 111 can control storing of the image data generated by the reading unit 118 in the storage 114 via the reading unit I/F 117.

The printing unit I/F 119 connects the printing unit 120 to the control unit 110. The CPU 111 controls inputting of image data to be printed to the printing unit 120 via the printing unit I/F 119. The printing unit 120 prints the image on a recording sheet fed from a feeding cassette.

The communication unit I/F 123 connects the control unit 110 to the network 100. The CPU 111 can control transmitting of image data and various kinds of information inside the MFP 101 to an external apparatus via the communication unit I/F 123, and can control receiving of print data from an external apparatus on the network 100.

Examples of a transmission/reception method through the network include a method of transmitting/receiving image data and various kinds of information using the above-described electronic mail, and a method of performing file transmission using other protocols (e.g., file transfer protocol (FTP), server message block (SMB), and web-based distributed authoring and versioning (WebDAV)). The present embodiment, however, is not limited to these method.

The CPU 111 controls a fax communication unit 122 via a fax unit I/F 121 to connect the MFP 101 to the public line network 105. The fax unit I/F 121 serves as an I/F for control of the fax communication unit 122. The CPU 111 controls a modem for facsimile communication and a network control unit (NCU) via the fax unit I/F 121 to connect to the public line network, and controls a facsimile communication protocol, etc.

While, in the MFP 101 according to the present embodiment, one CPU 111 uses one memory (RAM 113) to execute each processing illustrated in a flowchart described below, the present embodiment is not limited to the configuration. For example, each processing illustrated in the flowchart described below may be executed by making a plurality of CPUs, RAMs, ROMs, and storages cooperate with one another. Alternatively, a part of the processing may be executed by a hardware circuit, such as an application specific integrated circuit (ASIC) and a field programmable gate array (FPGA).

Figure 2:
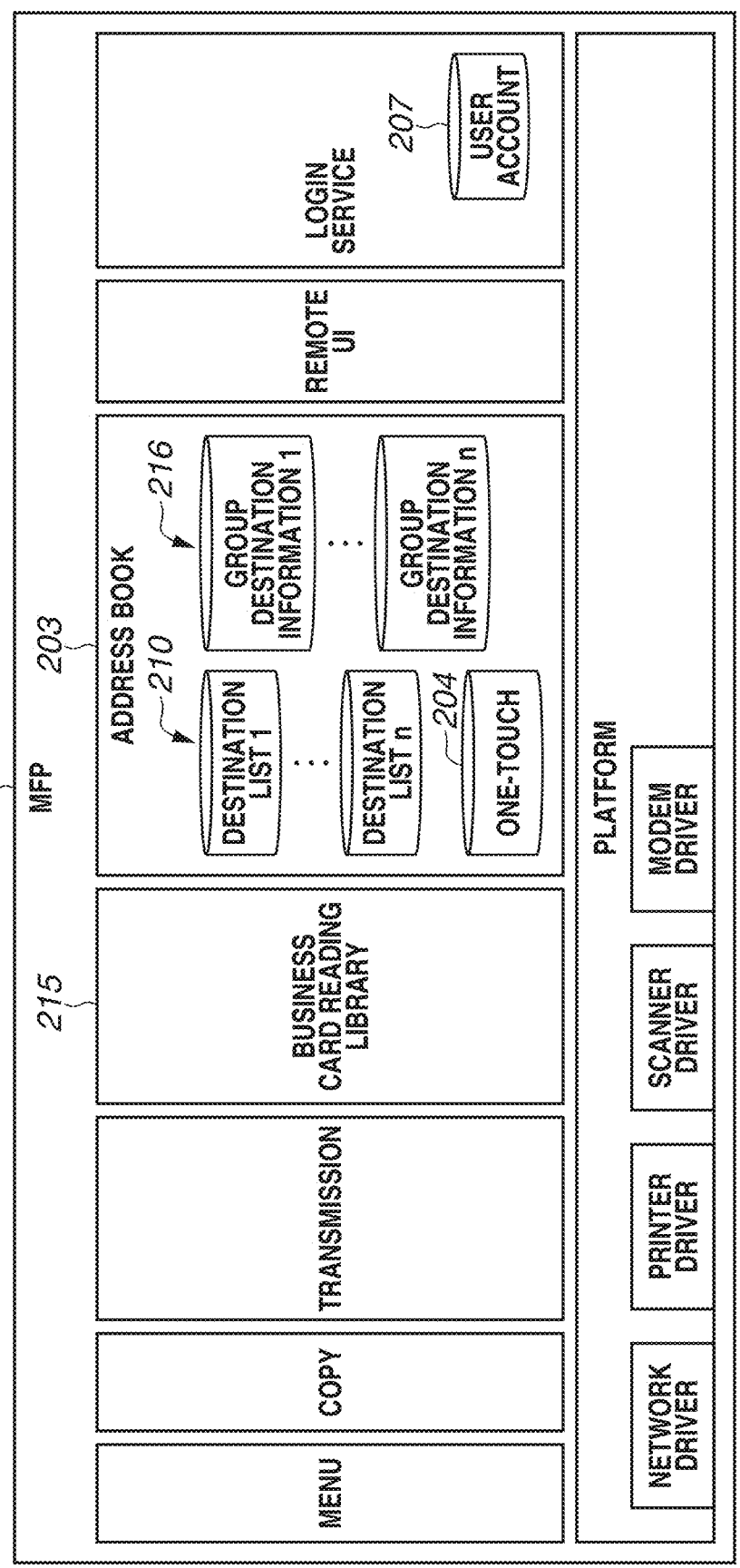
FIG. 2 is a diagram illustrating a software configuration of the MFP.

Next, a software configuration according to the present embodiment is described with reference to FIG. 2. FIG. 2 is a diagram illustrating a software configuration of the MFP 101 and a data region managed by software. In FIG. 2, description of a part of the software is omitted.

An address book 203, a one-touch 204, and a user account 207 each illustrate a data region for data that is stored in the RAM 113 and the storage 114 and managed by the software.

Data including an authority setting and an electronic mail address for each user account is held by the user account 207.

The address book 203 includes a plurality of destination lists 210 and one one-touch 204. Destination information stored in the destination lists 210 and destination information stored in the one-touch 204 can be referred to from the address book 203. Only the destination information stored in the one-touch 204 can be referred to by a one-touch operation. The one-touch operation allows the user to select, by operating one of operation keys provided in the MFP 102, predetermined destination information associated with the operation key.

Group destination information 216 serves as destination information in which a plurality of pieces of destination information in the same destination list is registered as one group. For example, destination information A, B, and C is grouped as group destination information D, and the group destination information is registered in a destination list 1 as one piece of destination information.

In a case where the group destination information is set as a transmission destination, multi-address transmission is performed to all of destinations of destination information included in the group destination information. Both a fax destination and an electronic mail address may be registered together in the group destination information.

A business card typically is a durable paper stock identification having printed enterprise information about a company or individual that may be shared as part of a formal introduction. The printed information may include a person's name, a business name, logo, and contact information such as addresses and other contact information such as a telephone number. A business card reading library 215 provides functions relating to scanning of a business card, performing of optical character recognition (OCR) processing on the scanned image, acquiring of destination information from the recognized character string, etc.

The destination information according to the present embodiment includes a related destination, a type and a name of the destination, etc. The details of the destination information will be described with reference to FIG. 3.

Figure 3:
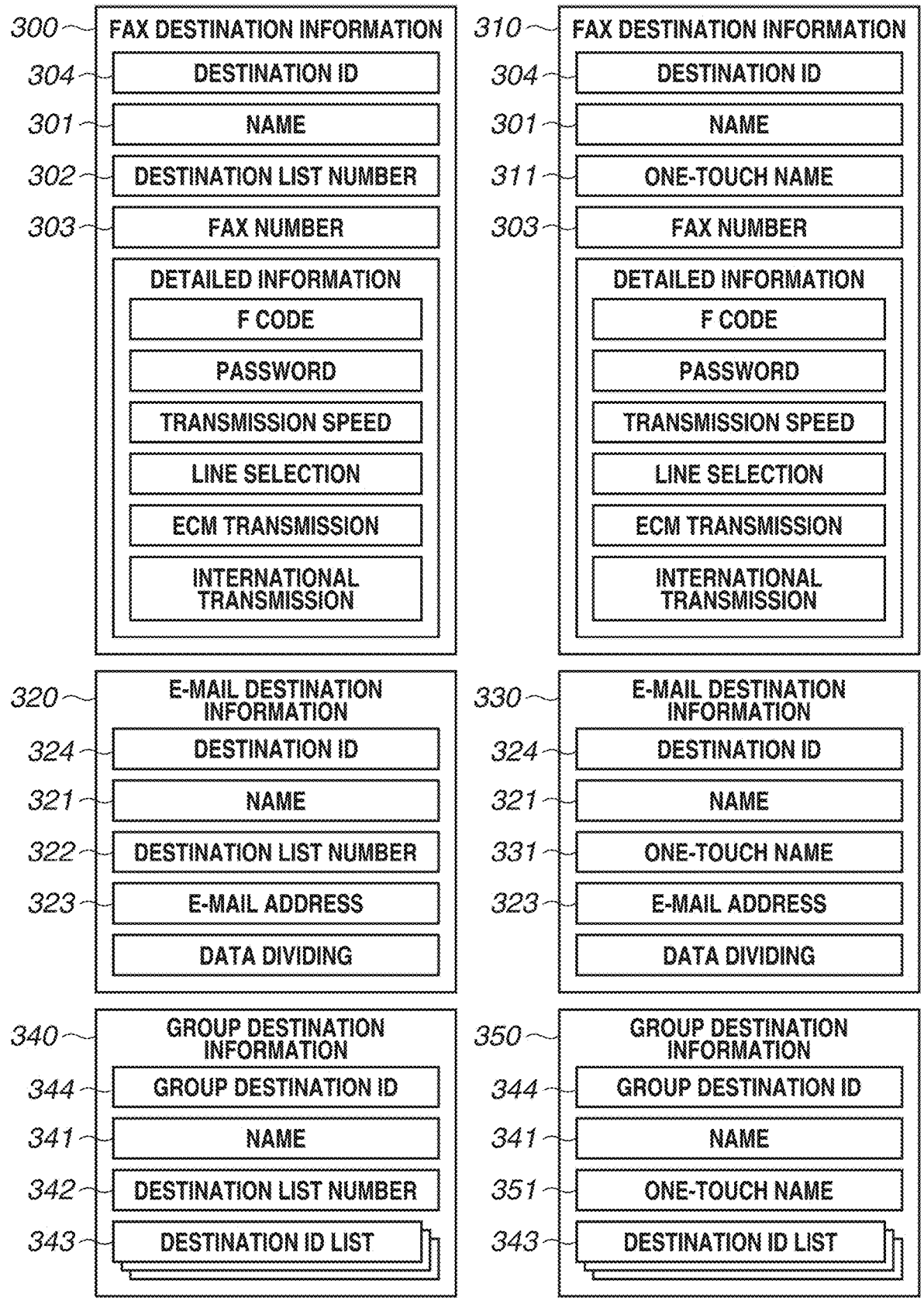
FIG. 3 is a diagram illustrating a data structure of destination information registered in an address book.

The details of the destination information registered in the destination lists 210 and the one-touch 204 is described with reference to FIG. 3. In FIG. 3, description of a part of registration items is omitted.

A list 300 has a structure of fax destination information that is registered in the destination lists 210. A destination identification (ID) 304 serves as a management number of each piece of destination information registered in the destination lists (1 to n). A name 301 serves as a registration name provided by the user to identify the destination. As the registration name, an optional character string, for example, a person's name and a company name, may be registered. A destination list number 302 indicates that the destination information is registered in which destination list (1 to n). A fax number 303 serves as a destination indicating a facsimile number, and is registered in the list 300 in association with the name 301 and the destination ID 304. While the fax destination information 300 includes detailed information, description thereof is omitted here.

A list 310 has a structure of the fax destination information registered in the one-touch 204. The fax destination information of the list 310 is different from the fax destination information of the list 300 in that a one-touch name 311 is provided in place of the destination list number 302. The one-touch name 311 is a display name displayed on an one-touch key. Description of other information is omitted because the other information is equivalent to the fax destination information 300.

A list 320 has a structure of the electronic mail destination information that is registered in the destination lists 210. A destination ID 324 serves as a management number of each piece of destination information registered in the destination lists (1 to n). A name 321 is a registration name provided by the user to identify the destination information. As the registration name, an optional character string, for example, a person's name and a company name, may be registered. A destination list number 322 indicates that the destination information is registered in which destination list (1 to n). An electronic mail address 323 is a destination for transmission of image data to a specified address.

A list 330 has a structure of the electronic mail destination information that is registered in the one-touch 204. The electronic mail destination information of the list 330 is different from the electronic mail destination information of the list 320 in that a one-touch name 331 is provided in place of the destination list number 322.

A list 340 has a structure of group destination information in which predetermined destination information registered in the destination lists 210 is set as a group, and the group is named and registered as one piece of destination information. A group destination ID 344 serves as a management number, which is from 1 to n, of each piece of group destination information registered in the destination lists. A name 341 is a registration name provided by the user to identify the group. As the registration name, an optional character string, for example, a person's name and a company name, may be registered. A destination list number 342 indicates that the group destination information is registered in which destination list having a number from among 1 to n.

In a destination ID list 343, a plurality of destination IDs (e.g., destination IDs 304 and 324) is associated with one group destination ID 344 as related destination information. In other words, the plurality of pieces of destination information (destination IDs) may be read from the destination ID list 343 as the related destination information using the group destination ID 344.

A list 350 indicates a structure of the group destination information registered in the one-touch 204. The group destination information of the list 350 is different from the group destination information of the list 340 in that a one-touch name 351 is provided in place of the destination list number 342.

A menu screen 400 of the MFP 101 is described with reference to FIGS. 4A and 4B. In the menu screen 400 illustrated in FIG. 4A, a copy key 401, a fax key 403, and a transmission key 402 are displayed.

The copy key 401 allows the user to use a copy function when being selected. The fax key 403 allows the user to use a fax function using a transmission protocol for fax when being selected. In the fax function, a fax number is settable as a transmission destination. The transmission key 402 allows the user to use a transmission function in which a plurality of transmission protocols are selected for a transmission destination when being selected. In the transmission function, for example, both the electronic mail address and the fax number may be set together for the transmission destination.

Figure 4A:
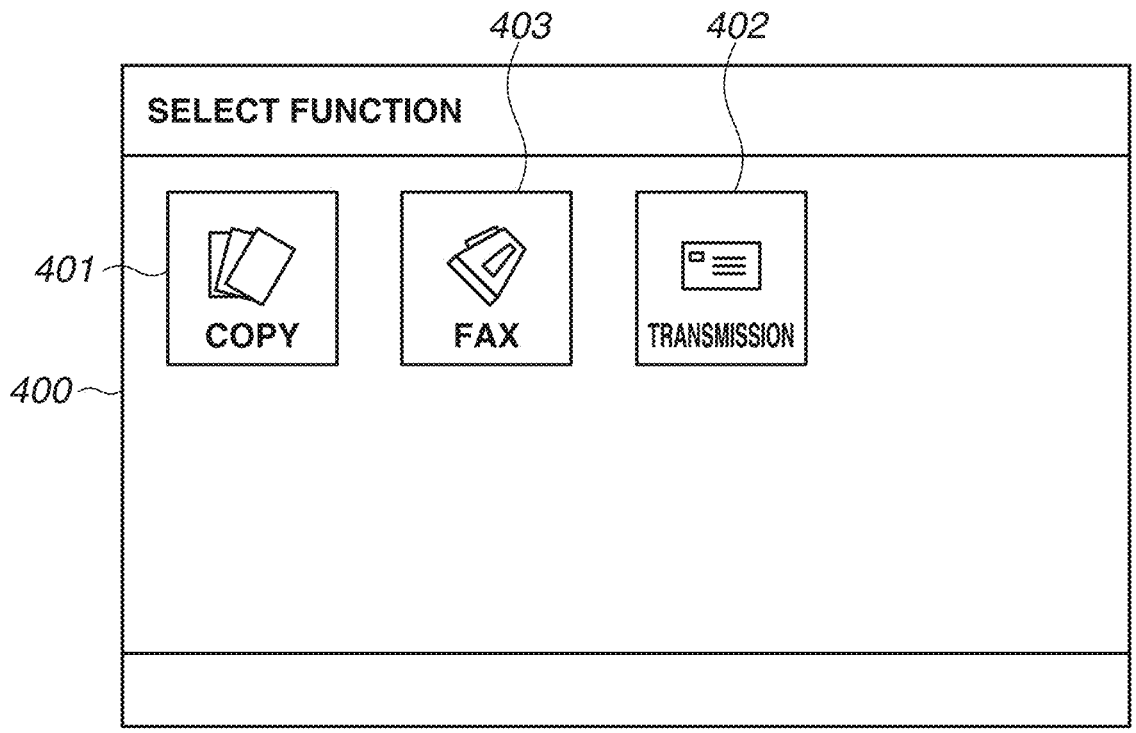
FIGS. 4A and 4B are diagrams each illustrating a menu screen of the MFP.

In FIG. 4A, the copy key 401, the fax key 403, and the transmission key 402 are illustrated as an example. Alternatively, a key enabling the user to use other functions and a setting key may be displayed. For example, an address book key 404 may be displayed as illustrated in FIG. 4B, and registration of a new address and setting of a transmission destination may be performed when the address book key 404 is selected. The address book key 404 includes the function same as a function of an address book key 501, which will be described below.

Figure 4B:
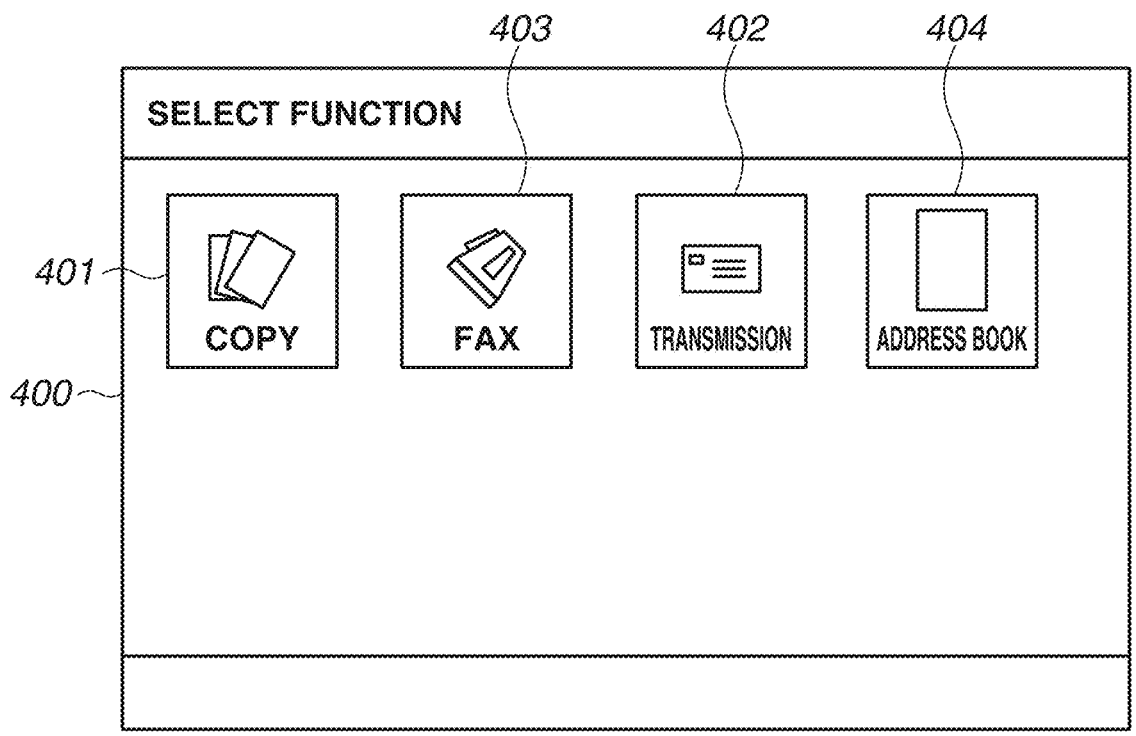

Next, a transmission screen 500 that is displayed on the operation unit 116 when the transmission key 402 illustrated in FIGS. 4A and 4B is selected is described with reference to FIG. 5.

Figure 5:
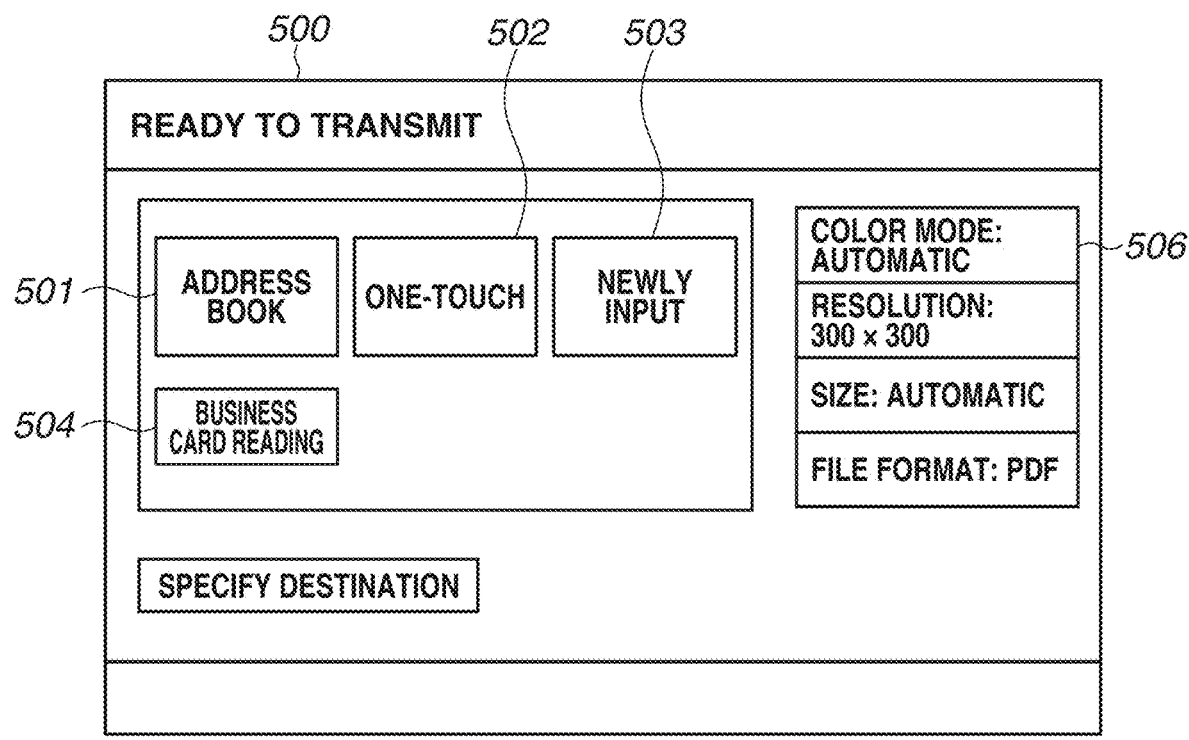
FIG. 5 is a diagram illustrating a transmission screen displayed on an operation unit when a transmission key is selected.

In the transmission screen 500 illustrated in FIG. 5, the address book key 501, a one-touch key 502, a newly input key 503, a business card reading key 504, and a transmission information setting area 506 are arranged.

The newly input key 503 opens a screen for newly inputting the destination information when being selected. The transmission information setting area 506 displays information arranged in the transmission information setting area 506. By selecting the transmission information setting area 506, a color mode, a resolution, a document size, a file format, etc. of image data to be transmitted can be designated.

The business card reading key 504 opens a business card reading screen 800 for a business card reading function illustrated in FIG. 8A, which will be described below, when being selected. The address book key 501 opens an address book for an address book function illustrated in FIG. 6A when being selected. The one-touch key 502 opens a one-touch address book for a one-touch function as illustrated in FIG. 6B when being selected.

Destination information registration screens 600 and 610 of the MFP 101 will be described below with reference to FIGS. 6A and 6B.

Figure 6A:
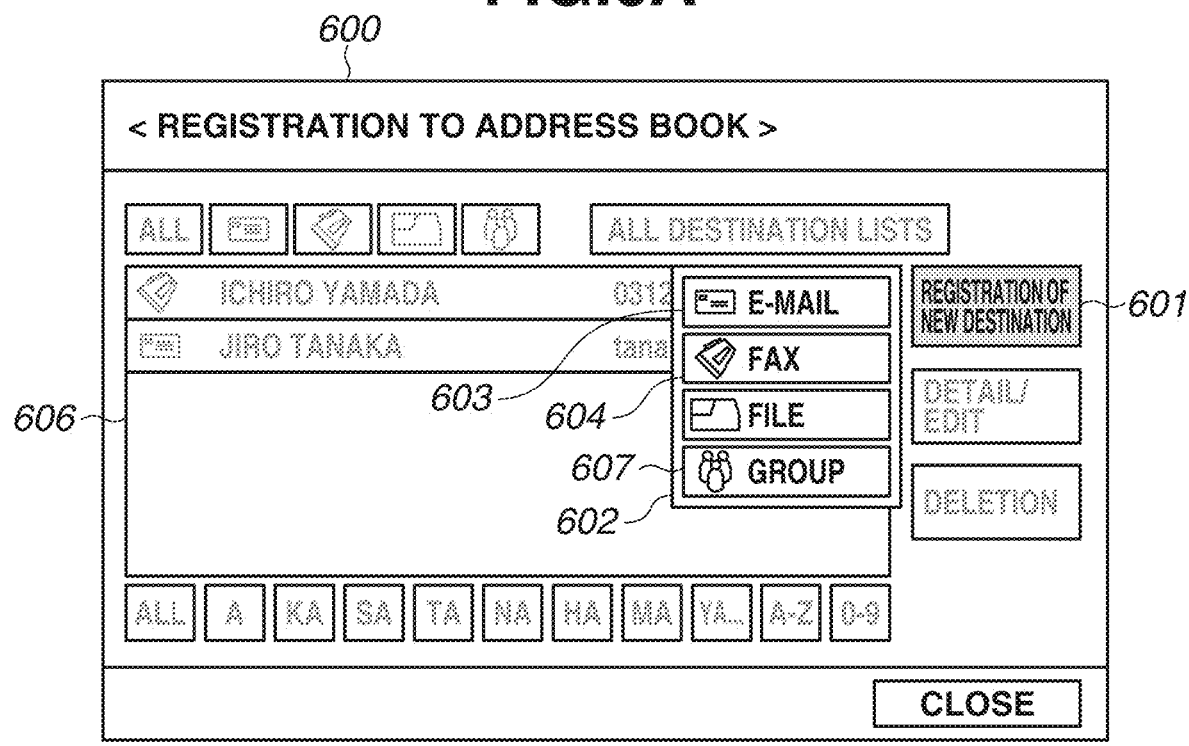
FIGS. 6A and 6B are diagrams each illustrating a registration screen for the address book.
Figure 6B:
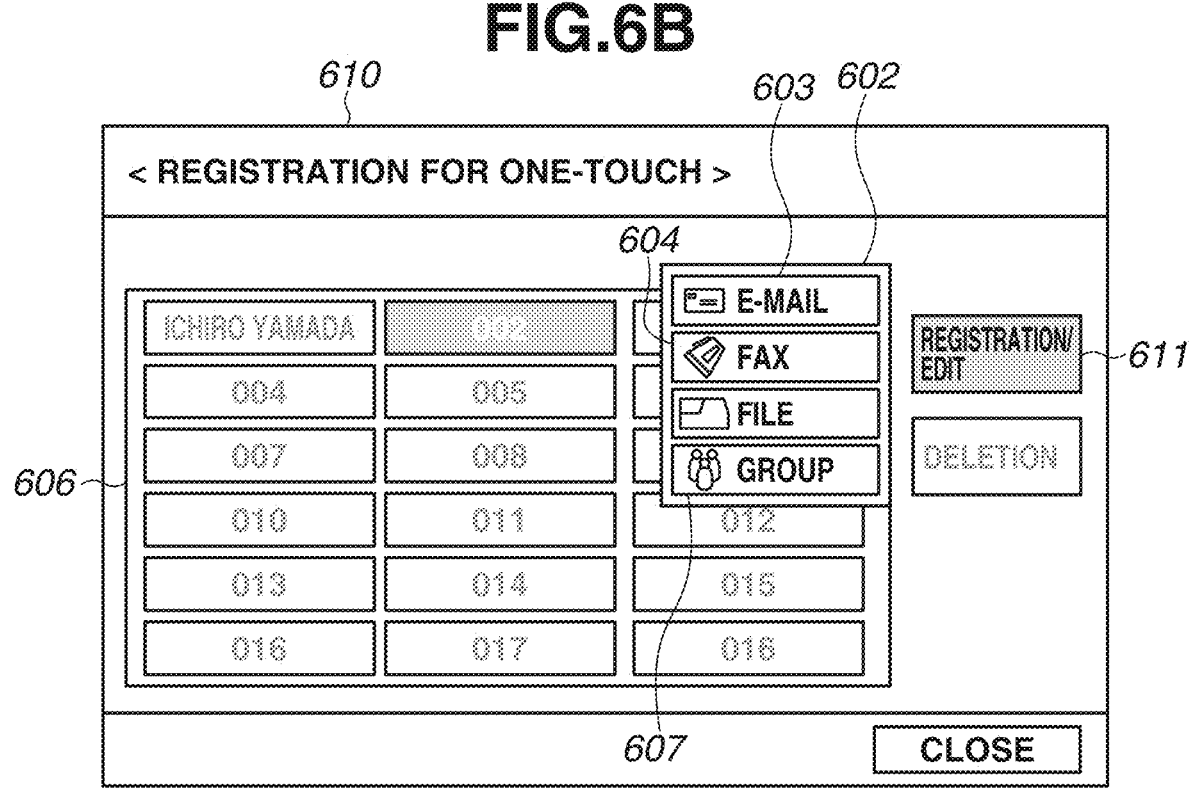

The registration screen 600 illustrated in FIG. 6A is displayed when the address book key 501 in FIG. 5 is selected. In this example, FIG. 6A illustrates a state where a new destination information registration key 601, which will be described below, displayed in the registration screen 600 has been selected.

The destination information that has been already registered is displayed in a display area 606. The new destination information registration key 601 is used for registering new destination information. When the new destination information registration key 601 is selected, a selection screen 602 is displayed. Keys for selecting a type or a registration method of destination information to be registered, such as an electronic mail destination information registration key 603, a fax destination information registration key 604, and a group destination information registration key 607 are displayed in the selection screen 602.

Figure 7:
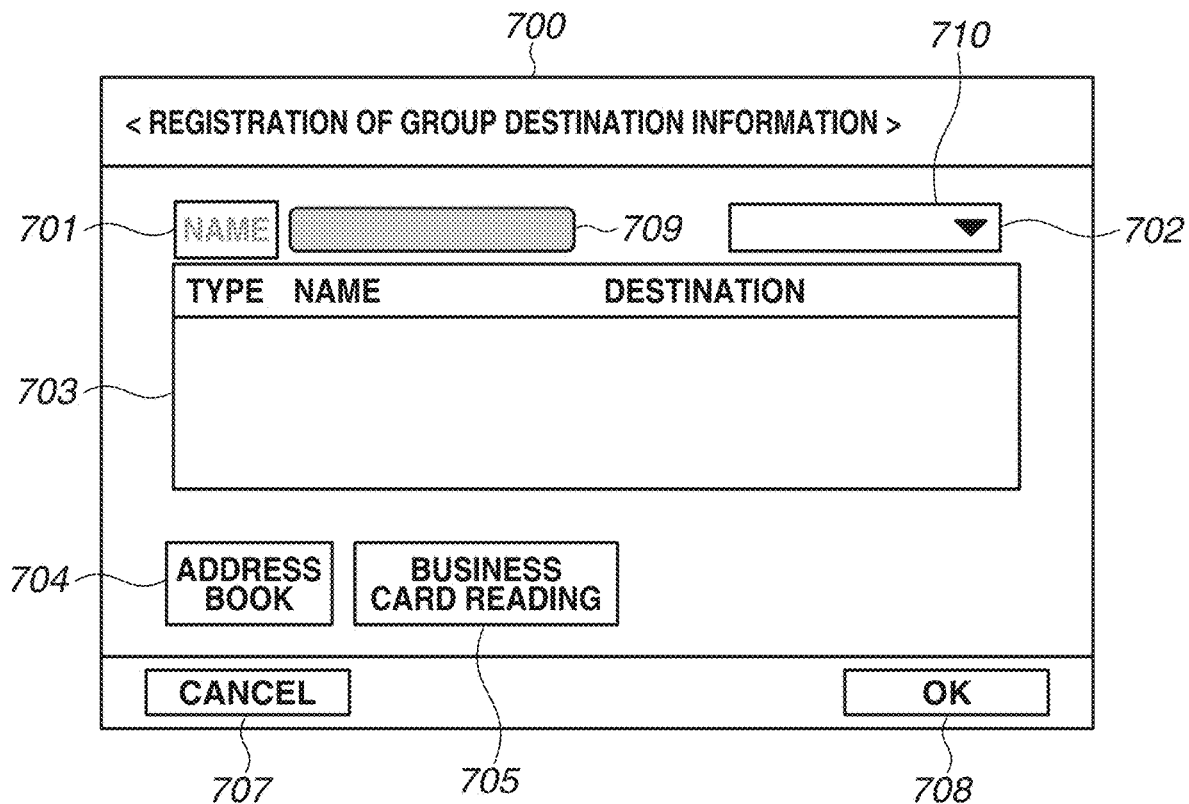
FIG. 7 is a diagram illustrating a group destination information registration screen.

The electronic mail destination information registration key 603 is used for registering the electronic mail destination information. The fax destination information registration key 604 is used for registering the fax destination information. The group destination information registration key 607 is used for registering the group destination information including a plurality of pieces of destination information. More specifically, the group destination information registration key 607 is for creating a group and registering the group as the group destination information. The plurality of destination information may be read out together in associated manner as the group from the storage. When the group destination information registration key 607 is selected, a group destination information registration screen 700 illustrated in FIG. 7 is displayed.

In a case where the one-touch key 502 illustrated in FIG. 5 is selected, the registration screen 610 illustrated in FIG. 6B is displayed. In the registration screen 610, the user selects a predetermined registration number to register the destination in the selected registration number. In this case, as an example, a state where Ichiro Yamada has been already registered and provided with a number 001 and a number 002 has been selected as a registration destination of the destination information is illustrated. A registration/edit key 611 corresponds to the new destination information registration key 601 and is used for registering new destination information.

The group destination information registration screen 700 that is displayed when the group destination information registration key 607 illustrated in FIGS. 6A and 6B is selected will be described below with reference to FIG. 7.

In the registration screen 700, a group destination information name edit key 701, a destination list selection key 702, a group display field 703, an address book key 704, a business card reading key 705, a cancel key 707, an OK key 708, a name display field 709, and a destination list display field 710 are displayed.

The group destination information name edit key 701 allows the user to input a name in the name display field 709 and edit the input name when being selected.

The destination list selection key 702 allows the user to select a destination list to which group destination information is registered, when being selected. For example, when a group having a group name of Yamada Building Firm is created, the group may be registered in the destination list 1.

The group display field 703 displays a list of the destination information, the type of the destination, and the registration name belonging to the group of the name display field 709. The type of the destination includes, for example, an electronic mail, a fax, or a telephone number.

The address book key 704 is used for adding the destination information that has been already registered in the address book, to the group destination information, i.e., to the list of destination information in the group display field 703.

The business card reading key 705 is used for reading a business card by the reading unit 118 and registering acquired destination information as the group destination information. When the business card reading key 705 is selected, the business card reading screen 800 illustrated in FIG. 8A is displayed.

The OK key 708 allows the user to confirm the group name, the destination information to be associated and registered as the group destination information, and the destination list to which the group destination is registered, when being selected.

The cancel key 707 cancels the registration of the group destination when being selected.

In this case, the configuration in which the new group destination information is registered in the address book has been described. In the alternative case, the destination information displayed in the group display field 703 may be added to previously-registered group destination information. In this case, in addition to the change of the name, when the group destination information name edit key 701 is selected, the group destination information previously registered in the address book may become selectable.

Next, the business card reading screen 800 displayed on the operation unit 116 when the business card reading key 705 illustrated in FIG. 7 is selected will be described with reference to FIGS. 8A and 8B.

A message 801 and a close key 802 are displayed in the business card reading screen 800 of FIG. 8A. The close key 802 closes the business card reading screen 800 to terminate the business card reading when being selected. The message 801 prompts the user to start of business card reading by the reading unit 118.

In FIG. 8A, when the user follows the message to start the business card reading in the MFP 101, the business card reading screen 800 shifts to a business card reading screen 810 illustrated in FIG. 8B. A message 803 indicating that the business card is being read is displayed in the business card reading screen 810.

In this example, as the business card reading processing, the reading unit 118 reads a plurality of business cards placed on a platen glass of the MFP 101 at a time. The CPU 111 recognizes regions corresponding to the respective business cards in the read image data, and extracts image data of each of the business cards. Further, the CPU 111 performs OCR processing (character recognition processing) on the image data of each of the business cards.

The CPU 111 acquires destination information, e.g., destination such as fax number and electronic mail address, and name, from a result of the OCR processing, and performs destination information acquisition processing to determine whether the acquired destination information is a fax destination, an electronic mail address, a name, or the like.

More specifically, for example, the name is often written by the largest font in the business card. Therefore, the name is determined based on a font size. The determination may be performed also using the number of characters as a determination factor. For example, to acquire a fax number, the CPU 111 acquires an area that includes a character string, such as "FAX" and "fax", and a numeric string of a number is acquired from the OCR processing result. The CPU 111 determines the numbers in the acquired area as the fax number to acquire the destination information. Alternatively, only the numeric string adjacent to the character string, such as "FAX" and "fax", may be extracted.

For example, to acquire an electronic mail address, the CPU 111 acquires an electronic mail address part based on a condition of a character string adjacent to "E-mail" or "mail address" or a character string including "@", from the OCR processing result. The CPU 111 determines the character string in the acquired area as the electronic mail address to acquire the destination information. Further, for example, to acquire a telephone number, the CPU 111 acquires an area that includes a character string, such as "TEL" and "telephone number" and a numeric string of a number, from the OCR processing result. The CPU 111 determines the numbers in the acquired area as the telephone number to acquire the destination information.

Alternatively, only a numeric string adjacent to a character string such as "TEL" and "telephone number" may be extracted. While, according to the present embodiment, the configuration in which the business cards placed on the platen glass are read has been described, the configuration is not limited thereto. For example, an auto document feeder (ADF) may be used.

After reading of the plurality of business cards and the OCR processing are completed, a business card reading result screen 900 illustrated in FIG. 9A is displayed.

The business card reading result screen 900 displayed on the operation unit 116 after the destination information acquisition processing is described with reference to FIG. 9A. FIG. 9A is a diagram illustrating an initial business card reading result screen, and FIG. 9B is a diagram illustrating a final business card reading result screen.

A business card screen 901, a name 902 that is an enlarged image of a name, a fax number 906 that is an enlarged image of a fax number, and an electronic mail address 910 that is an enlarged image of an electronic mail address are displayed in the business card reading result screen 900 in FIG. 9A. Further, a character information area 903 where character information of the name acquired from the OCR processing result is displayed, a character information area 907 where character information of the fax number is displayed, and a character information area 911 where character information of the electronic mail address is displayed are displayed in the business card reading result screen 900.

In the business card reading result screen 900, edit keys 904, 908 and 912 for editing the character information areas 903, 907, and 911, respectively, are further displayed. When any of the edit keys 904, 908, and 912 is selected, the CPU 111 displays an unillustrated software keyboard for editing the character information. In a case where an unillustrated numeric keypad is provided in the operation unit 116, the editing of the character information area 907 where the character information of the fax number is displayed may be performed using the numeric keypad, instead of the software keyboard.

In the business card reading result screen 900, a checkbox 905 and a checkbox 909 are further displayed in the business card reading result screen 900. When each of the check boxes as a reception unit is selected, the CPU 111 receives selection of the corresponding destination. The checkbox 905 is a checkbox for the user to select whether to register the fax number as the group destination. The checkbox 909 is a checkbox for the user to select whether to register the electronic mail address as the group destination.

One or both of the checkbox 905 and the checkbox 909 may be selected.

While, according to the present embodiment, the selection is received via the checkbox displayed in the business card reading result screen 900, the configuration is not limited thereto.

A message 916 is displayed in a case where the reading unit 118 has read the plurality of business cards. In this case, a configuration in which three business cards are read and the OCR processing is performed is illustrated as an example. The message 916 notifies that the business card reading result of a first business card is being displayed in the business card screen 901 and the rest of two business cards are ready for display. Further, a number 917 indicates that the business card reading result of what number of business card among the three business cards is being displayed.

Further, a cancel key 913 and a next key 915 are displayed in the business card reading result screen 900. The cancel key 913 is used for interrupting the group destination registration and returning to a previously displayed screen. According to the present embodiment, when the cancel key 913 is selected, the CPU 111 returns the display of the operation unit 116 to the transmission screen 500. while, according to the present embodiment, the CPU 111 returns the display of the operation unit 116 to the transmission screen 500, the CPU 111 can return the display of the operation unit 116 to the menu screen 400.

The return key 914 is a key to return the previous business card reading result screen 900. The return key 914 may not be displayed in the screen of FIG. 9A because the screen is the initial business card reading result screen. Alternatively, in the initial business card reading result screen, the return key 914 may include a function equivalent to the function of the cancel key 913.

The next key 915 is selected when the user completes confirmation and correction of the reading result and selection of the registration destination. When the next key 915 is selected, the CPU 111 shifts the business card reading result screen 900 to the screen for next business card. When the next key 915 is selected while no checkbox is selected, the display of the next business card may be performed without performing registration of the destination written on the displayed business card in the group destination. Alternatively, a skip key may be separately displayed.

FIG. 9B illustrates the final business card reading result screen 920. In this case, as an example, a message 919 notifies that the business card reading result of a third business card is being displayed in the business card screen 901 and no business card is ready for display. Further, a number 918 indicates that the business card reading result of the third business card among the three business cards is being displayed.

Figure 10A:
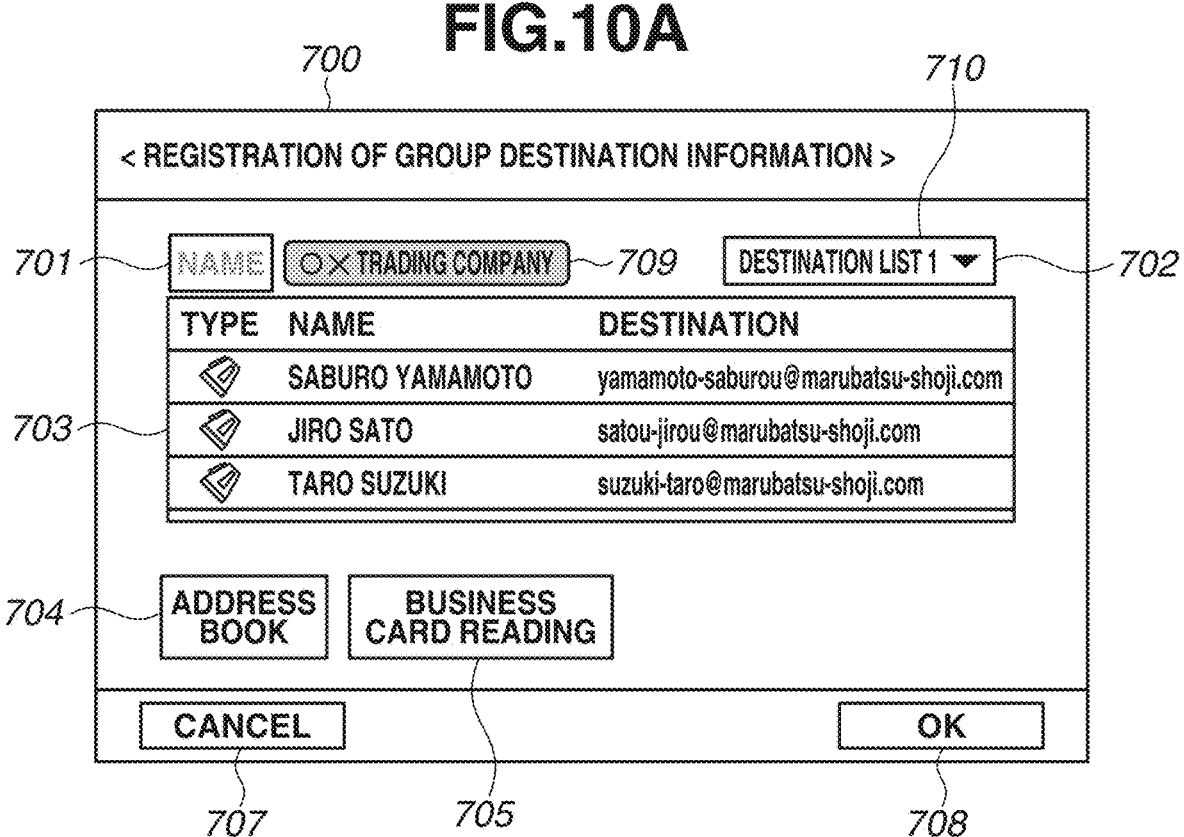
FIG. 10A is a diagram illustrating a registration screen on which pieces of destination information selected to be registered as group destination information are set.

When the next key 915 is selected in the final business card reading result screen 920, the screen transits to the registration screen 700 of FIG. 10A.

Although not illustrated in FIG. 9A, the telephone number may be displayed, and a checkbox for the user to select whether to register the telephone number and an edit key to edit the telephone number may be arranged.

As illustrated in the group destination information registration screen 700 of FIG. 10A, the destination information including the destination corresponding to the checkbox selected in the business card reading result screen 900 of FIG. 9A is set as the group destination information. For example, when the next key 915 is selected while the checkbox 909 is selected in each of the business card reading result screens 900 corresponding to the three business cards, three pieces of destination information are set in a group display area 703 of FIG. 10A.

Figure 10B:
FIG. 10B is a diagram illustrating a registration completion screen of the group destination information.

When an OK key 708 is selected in the screen of FIG. 10A, the group name and the plurality of pieces of destination information are registered as the group destination information in a predetermined destination list. In this process, a screen 10 that indicates completion of the group destination registration as illustrated in FIG. 10B may be displayed.

In FIGS. 9A and 9B and FIGS. 10A and 10B, the configuration in which only the electronic mail destination information is registered as the group destination information has been illustrated. Alternatively, only the fax destination information may be registered, or both the fax destination information and the electronic mail destination information may be registered together as the group destination information. When the group destination information is specified as the transmission destination, it is possible to perform multi-address transmission to all of the destinations belonging to the group.

Figure 11B:
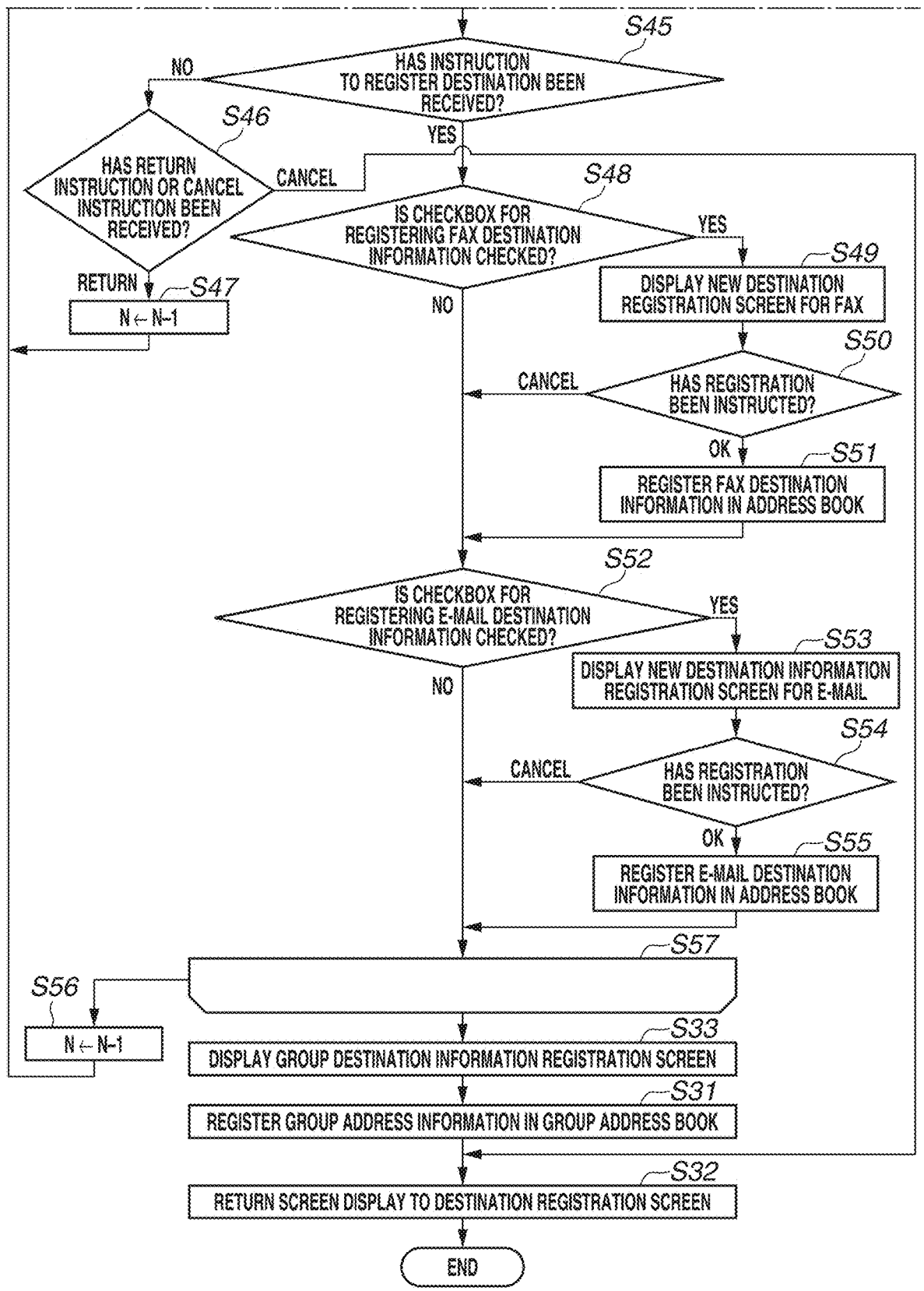
FIG. 11 is a diagram including the flowcharts of FIGS. 11A and 11B illustrating group destination information registration.

Next, a flowchart of the group destination registration in the MFP according to the present embodiment described in FIG. 1A to FIG. 10B is described with reference to FIG. 11 which is a diagram including the flowcharts of FIGS. 11A and 11B. A program to execute processing according to the flowchart of FIG. 11 is stored in the ROM 112 or the storage 114 illustrated in FIG. 1B, and is read to the RAM 113 and is executed by the CPU 111.

The flowchart of the group destination registration is started when the group destination information registration key 607 illustrated in FIG. 6A and FIG. 6B is selected.

In step S20, the CPU 111 causes the operation unit 116 to perform display processing to display the registration screen 700. After the processing in step S20 is completed, the processing proceeds to step S21.

In step S21, when the group destination information name edit key 701 is selected by the user, the CPU 111 receives input/edit of the name of the group destination information. When the destination list selection key 702 is elected by the user, the CPU 111 receives selection of the registration list to which the group destination information is registered. After the processing in step S21 is completed, the processing proceeds to step S22.

In step S22, when the business card reading key 705 is selected by the user, the CPU 111 reads the business card reading library 215 and displays the business card reading screen on the operation unit 116. After the processing in step S22 is completed, the processing proceeds to step S23.

In step S23, when an unillustrated start key in the operation unit 116 is selected by the user, the reading unit 118 starts to read the plurality of business cards placed on the platen glass. The plurality of pieces of image data generated by reading of the business cards using the reading unit 118 is stored in the storage 114. After the processing in step S23 is completed, the processing proceeds to step S24.

In step S24, the CPU 111 performs edge detection on the acquired image data based on image shade information, etc., to extract the image data of each of the business cards. The plurality of pieces of image data thus acquired are stored in the storage 114. Further, the CPU 111 counts the number of pieces of acquired business card image data (number of business cards), and stores the counted number in the RAM 113. After the processing in step S24 is completed, the processing proceeds to step S25.

In step S25, the CPU 111 performs the OCR processing on each of the plurality of pieces of business card image data acquired in step S24 to acquire character information, and stores the acquired character information in the RAM 113. Further, the CPU 111 acquires character information, including destination information, such as fax number and electronic mail address, and name, from the OCR processing result, and performs the destination information acquisition processing to determine whether the acquired character information is a fax destination, an electronic mail address, a name, or the like.

While, according to the present embodiment, the configuration in which the plurality of business cards placed on the platen glass is read at a time has been described, the configuration is not limited thereto. For example, an ADF may be used. In this case, in step S23, the reading unit 118 generates image data for each of the plurality of business cards. After the generating, the processing proceeds to step S25, and the CPU 111 performs the OCR processing on the plurality of pieces of generated image data.

Next, in step S40, the CPU 111 initializes a variable N to one. the CPU 111 repeatedly executes loop processing in steps S41 to S56 until the variable N exceeds the number of business cards read by the reading unit 118, as illustrated in step S41.

In step S42, the CPU 111 causes the user to display the business card reading result screen 900 on the operation unit 116.

In step S43, when the operation unit I/F 115 detects selection of any of edit keys 904, 908 and 912 displayed in the business card reading result screen 900 (YES in step S43), the processing proceeds to step S44.

In step S44, the CPU 111 displays a software keyboard on the operation unit 116 to allow the user to correct the text. When receiving correction using the software keyboard, the CPU 111 updates the holding text. After the processing in step S44 is completed or in a case where the operation unit I/F 115 does not detect selection of any of the edit keys 904, 908, and 912 in step S43 (NO in step S43), the processing proceeds to step S45.

In step S45, in a case where the operation unit I/F 115 detects selection of the return key 914 or the cancel key 913 (NO in step S45), the processing proceeds to step S46. In step S46, in a case where the operation unit I/F 115 detects selection of the return key 914 (RETURN in step S46), the processing proceeds to step S47. In step S47, the CPU 111 decrements the variable N by one and the processing returns to the head of the loop processing.

In a case where the operation unit I/F 115 detects selection of the cancel key 913 (CANCEL in step S46), the processing proceeds to step S32, and the display of the operation unit 116 is returned to the group destination information registration screen 700. In step S45, in a case where the operation unit I/F 115 detects selection of the next key 915 (YES in step S45), the CPU 111 determines that the destination registration instruction has been received, and the processing proceeds to step S48.

In step S48, the CPU 111 determines whether the checkbox 905 in the business card reading result screen 900 of FIGS. 9A and 9B is checked. In a case where the operation unit I/F 115 detects that the checkbox 905 is not checked (NO in step S48), the processing proceeds to step S52.

In a case where the operation unit I/F 115 detects that the checkbox 905 is checked (YES in step S48), the processing proceeds to step S49.

In step S49, the CPU 111 displays a screen for newly registering fax destination information (not illustrated) on the operation unit 116. In step S50, in a case where the operation unit I/F 115 has not received a registration instruction (CANCEL in step S50), the processing proceeds to step S52. In a case where the operation unit I/F 115 has received the registration instruction (OK in step S50), the processing proceeds to step S51. In step S51, the CPU 111 registers the destination information including the fax destination as individual registration in the address book 203. After the registering, the processing proceeds to step S52.

In step S52, the CPU 111 determines whether the checkbox 909 in the business card reading result screen 900 of FIGS. 9A and 9B is checked. In a case where the operation unit I/F 115 detects that the checkbox 909 is checked (NO in step S52), the processing proceeds to step S56.

In step S52, in a case where the operation unit I/F 115 detects that the checkbox 909 is ON (YES in step S52), the processing proceeds to step S53.

In step S53, the CPU 111 displays a screen for newly registering electronic mail destination information (not illustrated) on the operation unit 116. After the displaying, in step S54, in a case where the operation unit I/F 115 has not received the registration instruction in step S54 (CANCEL in step S54), the processing proceeds to step S56. In step S54, in a case where the operation unit I/F 115 has received the registration instruction (OK in step S54), the CPU 111 registers the individual electronic mail destination information in the address book 203 in step S55. After the registering, the processing proceeds to step S57 from step S55.

In step S57, in a case where the variable N satisfies the condition in step S41, the processing proceeds to step S33. In a case where the variable N does not satisfy the condition in step S41, the processing proceeds to step S56. In step S56, the CPU 111 increments the value of the variable N by one, and the processing returns to the head of the loop processing, i.e., returns to step S41.

In step S33, the CPU 111 displays the group destination information registration screen 700 illustrated in FIG. 10A, on the operation unit 116. When the OK key 708 is selected, the processing proceeds to step S31.

In step S31, the CPU 111 sets the destination information including the destination corresponding to the checkbox selected in the business card reading result screen 900 of FIGS. 9A and 9B as the group destination information.

More specifically, the ID list of the destination information, registered in the address book 203 in step S51 and step S55 in the loop processing the plurality of times, is stored as the destination ID list 343 in the group destination information 340 of the address book 203 illustrated in FIG. 3. The destination ID may be stored in the registered destination ID list 343 every time the processing in steps S51 and S55 of the loop processing is performed, or may be stored after the processing exits from the loop processing.

In step S32, the CPU 111 displays the registration screen 600, which is a transition source screen, on the operation unit 116. After the processing in step S32 is completed, the group destination information registration processing ends. Note that, in step S46, the return key 914 becomes selectable in a case where the variable N is equal to or larger than 2.

According to the present disclosure, when a document is read and the destination information is registered in the address book, it is possible to register the group destination information including the plurality of pieces of destination information. This refining operability of the user.

While, in the present embodiment, the configuration in which the plurality of business cards is read in order to acquire the plurality of pieces of destination information has been described, the configuration is not limited thereto. Alternatively, the information acquisition processing in step S25 may be performed on, for example, an address list including the destination information, or a predetermined sheet describing names and destinations, to acquire the plurality of destinations.

Also in this case, as described with reference to FIG. 5, document information (e.g., destination, such as fax number and electronic mail address, and name) is first acquired from the OCR processing result. After the acquiring, the CPU 111 determines whether the acquired document information is a fax destination, an electronic mail address, a name, or the like, to acquire a plurality of pieces of destination information. The CPU 111 registers the group destination information including the plurality of pieces of destination information.

While, in the present embodiment, the configuration in which one destination (e.g., electronic mail address or fax number) is written on the business card has been described, a plurality of destinations may be written and each of the destinations may be selectable in the business card reading result screen.

The second embodiment is different from the first embodiment in screen transition until the group destination information registration screen is displayed.

Figure 12A:
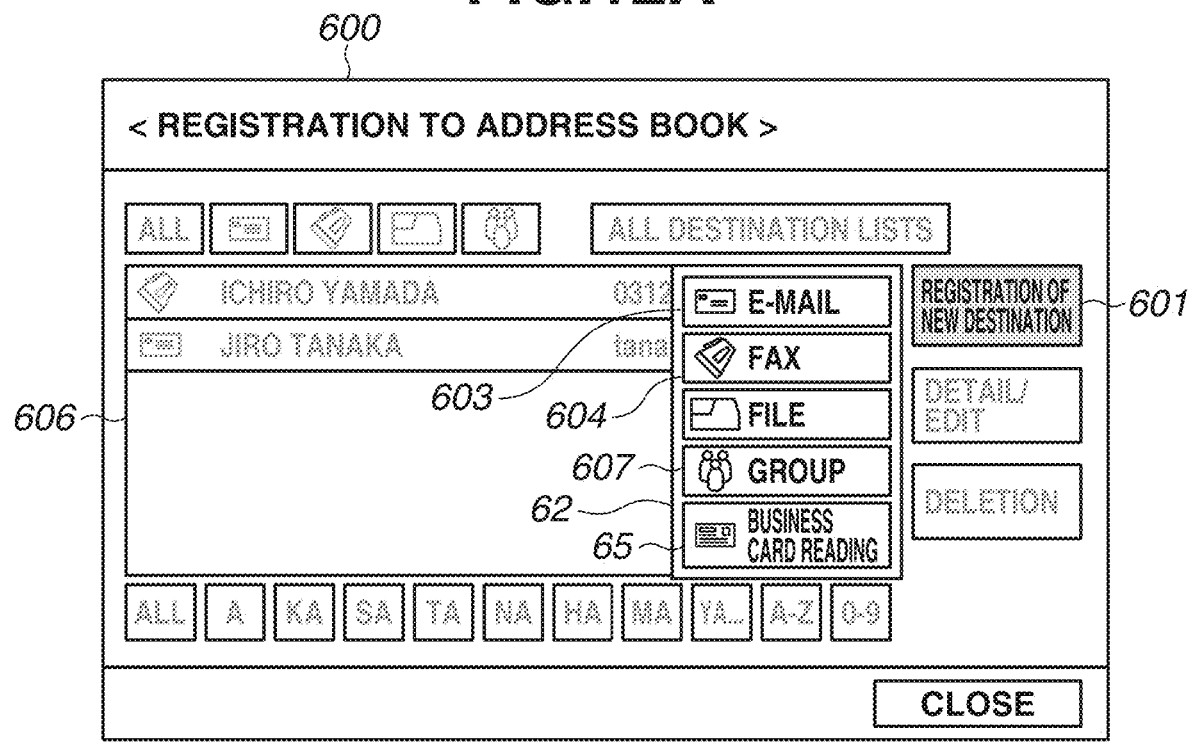
FIG. 12A is a diagram illustrating a registration screen for the address book and FIG. 12B is a diagram illustrating a registration confirmation screen of the group destination information.

FIG. 12A illustrates the registration screen 600 illustrated in FIG. 6A according to the present embodiment. When the new destination information registration key 601 is selected in FIG. 12A, the CPU 111 displays a selection screen 62. The selection screen 62 is a screen including a business card reading key 65. When the business card reading key 65 is selected, the screens of FIGS. 8A and 8B and FIGS. 9A and 9B described in the first embodiment are displayed.

Figure 12B:
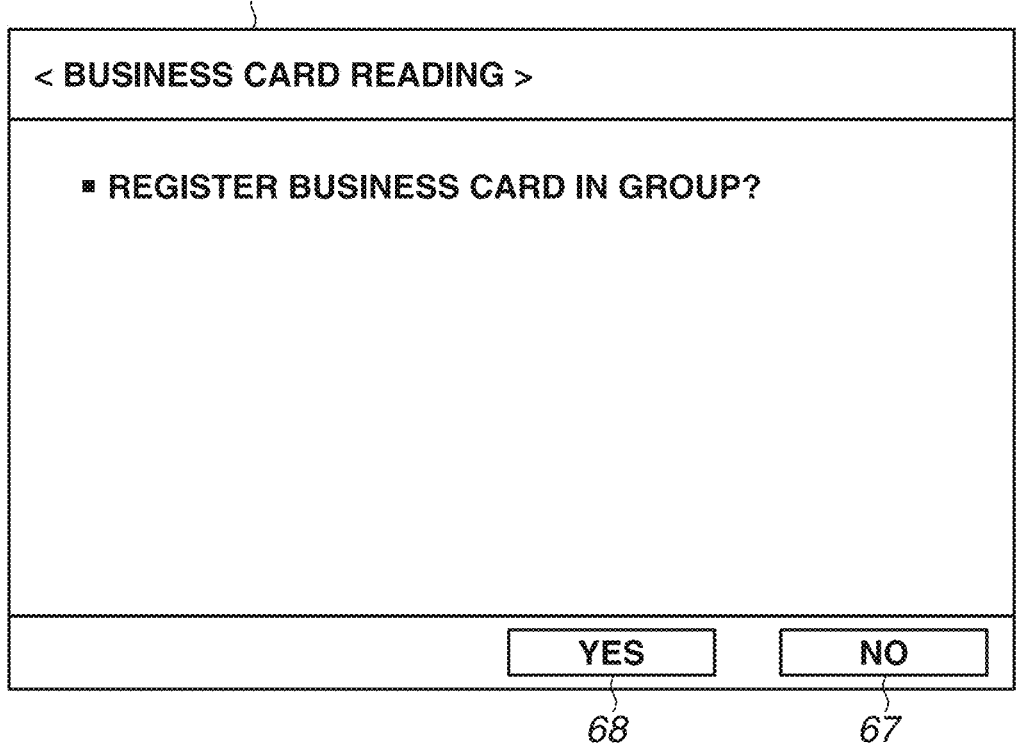

When the next key 915 is selected in the final business card reading result screen 900 of FIG. 9B, the CPU 111 displays a confirmation screen 66 illustrated in FIG. 12B, on the operation unit 116. The confirmation screen 66 is a screen for the user to confirm whether to perform registration of the group destination information. When a "NO" key 67 is selected, the registration in the address book is terminated. When a "YES" key 68 is selected, the group destination information registration screen 700 of FIG. 10A is displayed.

Such a configuration also achieves effects similar to the effects by the first embodiment.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2017-230835, filed Nov. 30, 2017, which is hereby incorporated by reference herein in its entirety.

What is claimed is:

1. An image reading apparatus comprising:
    a memory to store an address book;
    a reader that is able to read at least a first business card and a second business card based on one reading instruction received from a user; and
    a controller to obtain first destination information from first image data generated by reading the first business card and to obtain second destination information from second image data generated by reading the second business card,
    wherein the controller is able to register, in the address book, at least the first destination information and the second destination information as destination information different from each other.

2. The image reading apparatus according to claim 1, wherein the controller registers, in the address book, at least the first and second destination information as one group.

3. The image reading apparatus according to claim 1, wherein the controller is able to set at least the first and second destination information as destination information of multi-address transmission.

4. The image reading apparatus according to claim 1, further comprising a display to display at least the first and second destination information.

5. The image reading apparatus according to claim 1, wherein the controller obtains the first image data and the second image data by performing edge detection on image data generated by reading at least the first business card and the second business card.

6. The image reading apparatus according to claim 1, wherein the first destination information is an E-mail address and the second destination information is an E-mail address.

7. The image reading apparatus according to claim 1, wherein the first destination information is a facsimile address and the second destination information is a facsimile address.

8. The image reading apparatus according to claim 1, wherein the first destination information is an E-mail address and the second destination information is a facsimile address.

9. The image reading apparatus according to claim 1, further comprising a communicator to transmit image data using the first destination information.

10. The image reading apparatus according to claim 1, further comprising a user interface to select destination information to be registered from among at least the first and second destination information.

11. The image reading apparatus according to claim 4, further comprising a user interface to select destination information to be registered from among at least the first and second destination information displayed by the display.

12. A method to control an image reading apparatus, the method comprising:
    storing an address book;
    reading at least a first business card and a second business card based on one reading instruction received from a user; and
    obtaining first destination information from first image data generated by reading the first business card and obtaining second destination information from second image data generated by reading the second business card,
    wherein obtaining includes registering, in the address book, at least the first destination information and the second destination information as destination information different from each other.

* * * * *